United States Patent
Li et al.

(10) Patent No.: US 12,524,343 B2
(45) Date of Patent: Jan. 13, 2026

(54) COMPUTING NODE CLUSTER, DATA AGGREGATION METHOD, AND RELATED DEVICE

(71) Applicant: HUAWEI TECHNOLOGIES CO., LTD., Guangdong (CN)

(72) Inventors: Xiuqiao Li, Beijing (CN); Xiaogang Pan, Hangzhou (CN); Qiang Chen, Shanghai (CN); Shuai Gao, Hangzhou (CN); Hongwei Sun, Beijing (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 18/618,572

(22) Filed: Mar. 27, 2024

(65) Prior Publication Data

US 2024/0241826 A1 Jul. 18, 2024

Related U.S. Application Data

(63) Continuation of application No. PCT/CN2022/097285, filed on Jun. 7, 2022.

(30) Foreign Application Priority Data

Sep. 30, 2021 (CN) .......................... 202111166666.0

(51) Int. Cl.
*G06F 12/08* (2016.01)
*G06F 12/0802* (2016.01)

(52) U.S. Cl.
CPC ...... *G06F 12/0802* (2013.01); *G06F 2212/60* (2013.01)

(58) Field of Classification Search
CPC ........ G06F 3/0619; G06F 3/064; G06F 3/065; G06F 3/067; G06F 11/14; G06F 11/1402;
(Continued)

(56) References Cited

U.S. PATENT DOCUMENTS 5,918,229 A * 6/1999 Davis ................. G06F 16/9574
711/E12.066
8,069,366 B1 * 11/2011 Wenzel ............... G06F 11/2028
714/4.11

(Continued)

FOREIGN PATENT DOCUMENTS

CN 101187906 A 5/2008
CN 103389884 A 11/2013
(Continued)

OTHER PUBLICATIONS

Extended European Search Report in European Appln. No. 22874255.7, mailed on Nov. 27, 2024, 6 pages.
(Continued)

*Primary Examiner* — Tracy C Chan
(74) *Attorney, Agent, or Firm* — Fish & Richardson P.C.

(57) ABSTRACT

A computing node cluster provided in this embodiment of this application includes a plurality of computing nodes, and the plurality of computing nodes include an aggregation computing node. The plurality of computing nodes are configured to jointly perform a write operation on to-be-written data. Each of the plurality of computing nodes is configured to return a write success after writing partial data in the to-be-written data to a local cache. The aggregation computing node is configured to aggregate the partial data stored in caches of the plurality of computing nodes into aggregated data with consecutive addresses, and write the aggregated data into a storage node.

11 Claims, 6 Drawing Sheets

(58) Field of Classification Search
CPC .............. G06F 11/142; G06F 11/1446; G06F 11/1448; G06F 11/1451
See application file for complete search history.

(56) References Cited

U.S. PATENT DOCUMENTS

| | | | | |
|---|---|---|---|---|
| 2014/0075327 | A1* | 3/2014 | Noel | G06F 11/0721 715/744 |
| 2015/0378625 | A1* | 12/2015 | Resch | G06F 3/0616 711/114 |
| 2018/0137053 | A1* | 5/2018 | Kryukov | G06F 12/0842 |
| 2019/0095284 | A1* | 3/2019 | Balasubramanian ... | G06F 3/067 |

FOREIGN PATENT DOCUMENTS

| WO | WO2016146023 | * | 3/2016 |
|---|---|---|---|
| WO | WO2023050857 | * | 6/2022 |

OTHER PUBLICATIONS

International Search Report and Written Opinion in International Appln. No. PCT/CN2022/097285, mailed on Aug. 17, 2022, 17 pages (with English Translation).

\* cited by examiner

COMPUTING NODE CLUSTER, DATA AGGREGATION METHOD, AND RELATED DEVICE

CROSS-REFERENCE TO RELATED APPLICATIONS

This application is a continuation of International Application No. PCT/CN2022/097285, filed on Jun. 7, 2022, which claims priority to Chinese Patent application Ser. No. 202111166666.0, filed on Sep. 30, 2021. The disclosures of the aforementioned applications are hereby incorporated by reference in their entireties.

TECHNICAL FIELD

This application relates to the field of data processing, and in particular, to a computing node cluster, a data aggregation method, and a related device.

BACKGROUND

In a distributed data computing system, data that needs to be accessed may be allocated to a plurality of computing nodes for processing separately, and each computing node processes partial data. However, because each computing node runs a plurality of processes for data processing, for one computing node, addresses of data processed by the plurality of processes are inconsecutive. To improve data writing efficiency, the data needs to be exchanged with another computing node, so that addresses of the data in each computing node are consecutive, in this way, the computing node may write data in the computing node into a storage node. However, in related technologies, the data can be written into the storage node only after the computing node completes data exchange with another computing node, which increases a data access delay.

SUMMARY

Embodiments of this application provide a computing node cluster, a data aggregation method, and a related device, to reduce a delay of distributed computing.

According to a first aspect, an embodiment of this application provides a computing node cluster, including a plurality of computing nodes, where the plurality of computing nodes include an aggregation computing node; the plurality of computing nodes are configured to jointly perform a write operation on to-be-written data; each of the plurality of computing nodes is configured to return a write success after writing partial data in the to-be-written data into a local cache; and the aggregation computing node is configured to aggregate the partial data stored in the caches of the plurality of computing nodes into aggregated data with consecutive addresses, and write the aggregated data into a storage node.

In this embodiment of this application, when the computing node returns the write success, input output (IO) of corresponding data is completed, so that other data can be processed. Compared with a conventional data aggregation method, the IO is completed only after data aggregation is completed to obtain continuous aggregated data, and each computing node can process other data. In this embodiment of this application, the IO is decoupled from the data aggregation. In a data aggregation process, the IO is completed, and the computing node may process other data. Therefore, in the data aggregation process, resources such as a CPU computing resource and a memory occupied by the IO are released, thereby improving CPU resource utilization and data processing efficiency.

If write operations of a plurality of to-be-written data need to be performed, that is, a plurality of rounds of IO and data aggregation need to be performed, each computing node needs to write partial data (some data blocks) of the plurality of to-be-written data, and the aggregation computing node needs to perform data aggregation (IO1, aggregation of data blocks in IO1, IO2, aggregation of data blocks in IO2 . . . ) for many times. The IO is decoupled from the data aggregation. In a process in which the aggregation computing node performs previous data aggregation, each computing node may perform IO corresponding to next data aggregation (for example, when data blocks in the IO1 are aggregated, the IO2 may be performed at the same time), so that different rounds of IO and data aggregation are implemented in parallel, thereby reducing a latency of waiting by the computing node, and reducing a latency of performing a write operation on the plurality of to-be-written data.

In an optional implementation, the computing node cluster includes at least two aggregation computing nodes, and each of the at least two aggregation computing nodes is configured to aggregate some data blocks in the to-be-written data, where addresses of the some data blocks are consecutive. When aggregating the some data blocks, each aggregation computing node is specifically configured to: determine whether a data block that is to be aggregated by the aggregation computing node are locally in the aggregation computing node; and if the data block is not local, determine a computing node in which the data blocks are located, obtain the data block from a cache of the determined computing node, and aggregate the obtained data block with a data block in the aggregation computing node.

In this embodiment of this application, the aggregation computing node may determine a computing node in which the aggregated data block is located, and obtain a corresponding data block from the computing node, thereby implementing cross-node data block aggregation.

In an optional implementation, when aggregating the some data blocks, each aggregation computing node is specifically configured to: determine whether the data block that is to be aggregated by the aggregation computing node is local, and if the data block is local, obtain the data block from the local cache, and implement aggregation of the data block.

In this embodiment of this application, the aggregation computing node implements aggregation of the data block of the node.

In an optional implementation, the computing node cluster includes at least two aggregation computing nodes, and each of the at least two aggregation computing nodes is configured to aggregate some data blocks in the to-be-written data, where addresses of the some data blocks are consecutive. When aggregating the some data blocks, each aggregation computing node is specifically configured to: determine whether a cache of the aggregation computing node includes a data block that is not aggregated by the aggregation computing node, and if the cache includes the data block, determine an aggregation node of the data block, send the data block to an aggregation computing node that aggregates the data block, receive a data block that is aggregated by the aggregation computing node and that is sent by another computing node, and aggregate the data block with a data block of the aggregation computing node.

In an optional implementation, the plurality of computing nodes are specifically configured to: jointly perform the write operation on the to-be-written data based on a task delivered by an application server; and each aggregation computing node is specifically configured to: determine an aggregation view based on the task; and determine, based on the aggregation view, computing node information in which the data block that is to be aggregated by the aggregation computing node is located, and obtain, from a corresponding computing node based on the computing node information, the data block that is to be aggregated by the aggregation computing node.

In this embodiment of this application, the aggregation computing node obtains the data block that is to be aggregated through the aggregation view, so that the data block that is to be aggregated can be prevented from being obtained incorrectly or not obtained, and integrity and accuracy of an aggregation result can be ensured.

In an optional implementation, the plurality of computing nodes include caches, the caches of the plurality of computing nodes form a shared cache pool (also referred to as a cache pool in this application), and each computing node can access data in the shared cache pool. A process for the aggregation computing node to obtain a data block from a cache of the determined computing node may specifically include: The aggregation computing node directly reads the data block from the cache of the computing node.

In this embodiment of this application, because caches of each computing node jointly form the cache pool, in a process for the aggregation computing node to perform data aggregation, the data block that is to be aggregated may be directly read from a cache of another computing node, which improves efficiency of the aggregation computing node to obtain the data block that is to be aggregated, reduces a delay of a data aggregation process, and reduces a delay of a write operation on the to-be-written data.

In an optional implementation, the step of obtaining a data block from a cache of the determined computing node may specifically include: The aggregation computing node receives a communication message from the computing node, where the communication message includes a data block that is to be aggregated by the aggregation computing node.

In an optional implementation, the communication message may be a message of a high-speed data transmission protocol. Optionally, the high-speed data transmission protocol may be remote direct data access (RDMA).

In this embodiment of this application, because transmission efficiency of the high-speed transmission protocol is high, the aggregation computing node obtains the data block that is to be aggregated by using the high-speed data transmission protocol, so that a latency of obtaining the data block can be reduced, thereby reducing a latency of a data aggregation process, and further reducing a latency of the write operation on the to-be-written data.

According to a second aspect, an embodiment of this application provides a data aggregation method, where the method is applied to a computing node cluster including a plurality of computing nodes, the plurality of computing nodes include an aggregation computing node, the plurality of computing nodes are configured to jointly perform a write operation on to-be-written data, and the method includes: Each of the plurality of computing nodes returns a write success after writing partial data in the to-be-written data into a local cache. The aggregation computing node aggregates the partial data stored in caches of the plurality of computing nodes into aggregated data with consecutive addresses, and writes the aggregated data into a storage node.

For beneficial effects of the second aspect, refer to the first aspect. Details are not described herein again.

In an optional implementation, the computing node cluster includes at least two aggregation computing nodes, and each of the at least two aggregation computing nodes is configured to aggregate some data blocks in the to-be-written data, where addresses of the some data blocks are consecutive. The step that the aggregation computing node aggregates the partial data stored in caches of the plurality of computing nodes into aggregated data with consecutive addresses may specifically include: Each aggregation computing node determines whether a data block that is to be aggregated by the aggregation computing node is local, and if the data block is not local, determines a computing node in which the data block is located, obtains the data block from a cache of the determined computing node, and aggregates the data block with a data block in the aggregation computing node.

In an optional implementation, the computing node cluster includes at least two aggregation computing nodes, and each of the at least two aggregation computing nodes is configured to aggregate some data blocks in the to-be-written data, where addresses of the some data blocks are consecutive. The step that the aggregation computing node aggregates the partial data stored in caches of the plurality of computing nodes into aggregated data with consecutive addresses may specifically include: Each aggregation computing node determines whether a cache of the aggregation computing node includes a data block that is not aggregated by the aggregation computing node, and if the cache of the aggregation computing node includes the data block, determines an aggregation computing node that aggregates the data block, and sends the data block to the aggregation computing node that aggregates the data block. Each aggregation computing node receives a data block that is aggregated by the aggregation computing node and that is sent by another computing node, and aggregates the data block with a data block of the aggregation computing node.

In an optional implementation, the plurality of computing nodes are specifically configured to: jointly perform the write operation on the to-be-written data based on a task delivered by an application server. Before the aggregation computing node aggregates the partial data stored in caches of the plurality of computing nodes into aggregated data with consecutive addresses, the method may further include: determining an aggregation view based on the task; and determining, based on the aggregation view, computing node information in which the data block that is to be aggregated by the aggregation computing node is located, and obtaining, from a corresponding computing node based on the computing node information, the data block that is to be aggregated by the aggregation computing node.

In an optional implementation, the plurality of computing nodes include caches, the caches of the plurality of computing nodes form a shared cache pool, and each computing node may access data in the shared cache pool. The step of obtaining the data block from a cache of the determined computing node may specifically include: The aggregation computing node directly reads the data block from the cache of the computing node.

In an optional implementation, the step of obtaining the data block from a cache of the determined computing node may specifically include: The aggregation computing node receives a communication message from the computing node, where the communication message includes the data block.

According to a third aspect, an embodiment of this application provides a computing node, including a processor, a cache, and a network adapter. The cache is configured to store instructions, and the processor is configured to invoke the instructions, so that a computing device performs the data aggregation method in the second aspect.

According to a fourth aspect, an embodiment of this application provides a computer-readable storage medium, where the computer-readable storage medium stores a computer program, and when the computer program is run, the method in the second aspect is implemented.

According to a fifth aspect, an embodiment of this application provides a computer program product, where the computer program product includes computer program code, and when the computer program code is run, the method in the second aspect is implemented.

DESCRIPTION OF EMBODIMENTS

Figure 1:
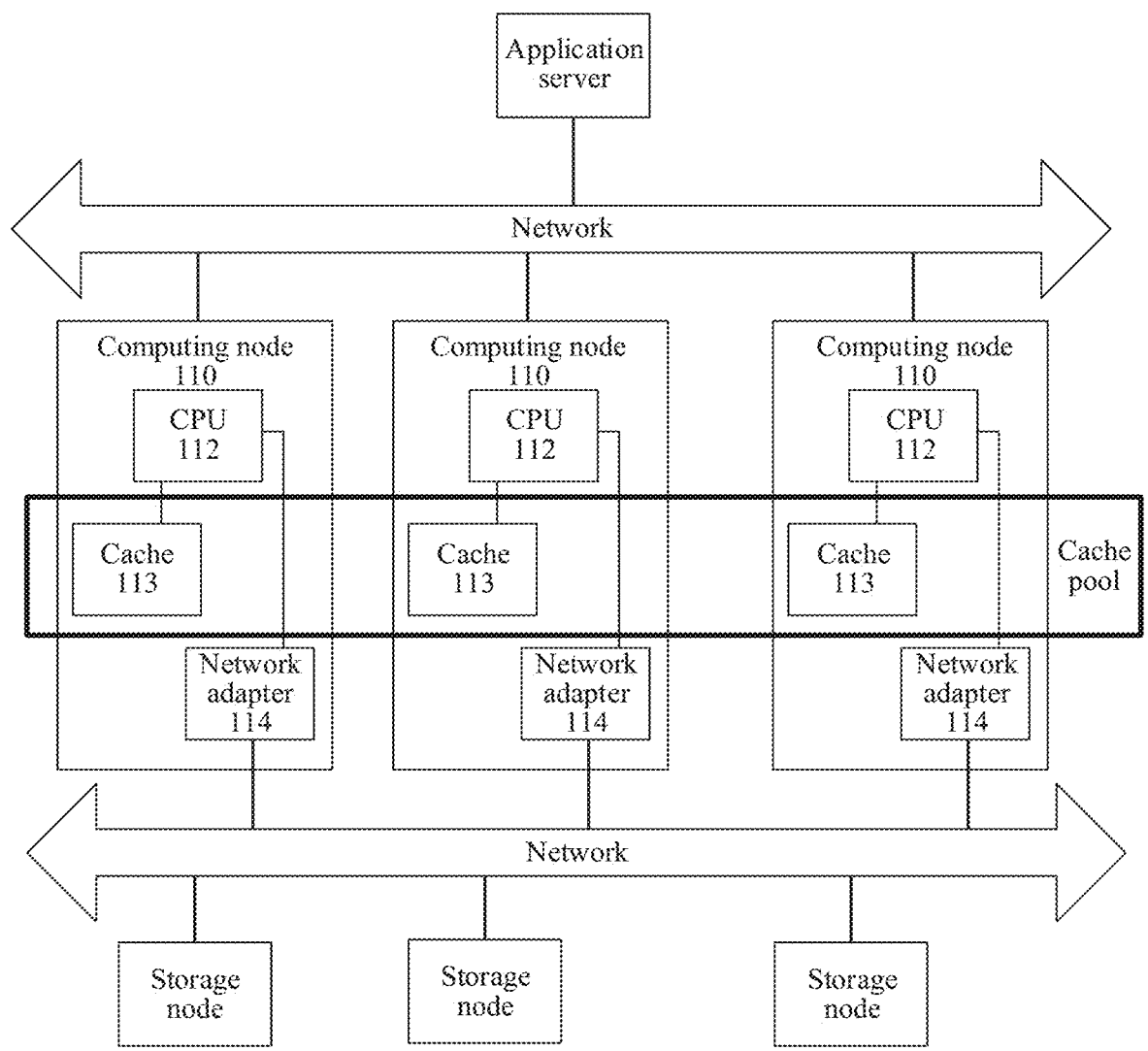
FIG. 1 is a schematic diagram of a network architecture to which an embodiment of this application is applicable.

FIG. 1 is a schematic diagram of a network architecture of a computing system to which an embodiment of this application is applicable. As shown in FIG. 1, the architecture includes an application server, a computing node cluster, and a storage node cluster. An application runs on the application server, and the application generates a data access request during running, and sends the generated data access request to the computing node cluster through a network for processing.

The computing node cluster includes a plurality of computing nodes 110 (three computing nodes 110 are shown in FIG. 1, but are not limited to three computing nodes 110), and the computing nodes 110 may communicate with each other. The computing node 110 is a computing device, such as a server, a desktop computer, or a controller of a storage array.

In terms of hardware, as shown in FIG. 1, the computing node 110 includes at least a processor 112, a memory 113, and a network adapter 114. The processor 112 is a central processing unit (CPU), and is configured to process a data access request from outside of the computing node 110 or a request generated inside the computing node 110. For example, when receiving a data write request (a data access request), the processor 112 temporarily stores data in the data write request in the memory 113. When a total amount of data in the memory 113 reaches a specific threshold, the processor 112 sends the data stored in the memory 113 to the storage node 100 for persistent storage. In addition, the processor 112 is further configured to perform calculation or processing on data, for example, metadata management, data deduplication, data compression, virtualized storage space, and address translation.

One computing node 110 in FIG. 1 shows only one CPU 112. In actual applications, there are usually a plurality of CPUs 112 in the computing node 110, and one CPU 112 has one or more CPU cores. A quantity of CPUs and a quantity of CPU cores are not limited in this embodiment.

The cache 113 refers to an internal memory that directly exchanges data with the processor. The cache can read and write data at any time, and is fast, and is used as a temporary data memory of an operating system or another running program. The cache includes at least two types of memories. For example, the cache may be a random access memory, or may be a read-only memory (ROM). For example, the random access memory is a dynamic random access memory (DRAM), or a storage class memory (SCM). The DRAM is a semiconductor memory, which is a volatile memory device, like most random access memory (RAM). The SCM is a composite storage technology that combines features of both a conventional storage apparatus and a memory. A storage class memory can provide a faster read/write speed than a hard disk, but is slower than a DRAM in terms of an access speed and is cheaper than a DRAM in terms of costs. However, the DRAM and the SCM are merely examples for description in this embodiment, and the cache may further include another random access memory, for example, a static random access memory (SRAM). The read-only memory, for example, may be a programmable read-only memory (PROM), an erasable programmable read-only memory (EPROM), or the like. In addition, the cache 113 may also be a dual in-line memory module or a dual-line memory module (DIMM), that is, a module including a dynamic random access memory (DRAM), or may be a solid-state disk (SSD). In actual applications, a plurality of caches 113 and different types of caches 113 may be configured in the computing node 110. A quantity and a type of the cache 113 are not limited in this embodiment. In addition, the cache 113 may be configured to have a power protection function. The power protection function means that when the system is powered off and then powered on again, data stored in the cache 113 is not lost. A cache with the power-protection function is referred to as a non-volatile memory.

The network adapter 114 is configured to communicate with the storage node 100. For example, when a total amount of data in the cache 113 reaches a specific threshold, the computing node 110 may send a request to the storage node 100 through the network adapter 114, to perform persistent storage on the data. In addition, the computing node 110 may further include a bus, configured to perform communication between components in the computing node 110. In terms of functions, because a main function of the computing node 110 in FIG. 1 is a computing service, and a remote memory may be used to implement persistent storage during data storage, the computing node has fewer local memories than a conventional server, thereby saving costs and space. However, this does not mean that the computing node 110 cannot have a local memory. During actual implementation, the computing node 110 may also have a few built-in hard disks or a few external hard disks.

Any computing node 110 may access any storage node 100 in the storage node cluster through a network. The storage node cluster includes a plurality of storage nodes 100 (FIG. 1 shows three storage nodes 100, but is not limited to the three storage nodes 100).

In this embodiment of this application, the plurality of computing nodes 110 in the computing node cluster are configured to jointly perform a write operation on to-be-written data based on the data access request delivered by the application server. Specifically, each computing node 110 is configured to return a write success after writing partial data in the to-be-written data to a local cache.

Some computing nodes in the computing node cluster are aggregation computing nodes, and the aggregation computing node is configured to: aggregate the partial data in the to-be-written data stored in the cache 113 of the plurality of computing nodes 110 into aggregated data with consecutive addresses, and write the aggregated data into the storage node. In this embodiment of this application, aggregated data with consecutive addresses is also referred to as the to-be-written data.

In this embodiment of this application, caches 113 on different computing nodes 110 jointly form a cache pool. Any computing node 110 in the computing node cluster may obtain data stored in any cache 113 in the cache pool. Optionally, any computing node 110 in the computing node cluster may directly read content stored in the cache 113 on another computing node 110 in the cache pool. Alternatively, any computing node 110 in the computing node cluster may obtain, in a form of a communication message or the like, data stored in the cache 113 on another computing node 110.

Based on the architecture shown in FIG. 1, an embodiment of this application provides a data aggregation method, to reduce a latency of distributed computing by decoupling IO from aggregation.

Figure 2:
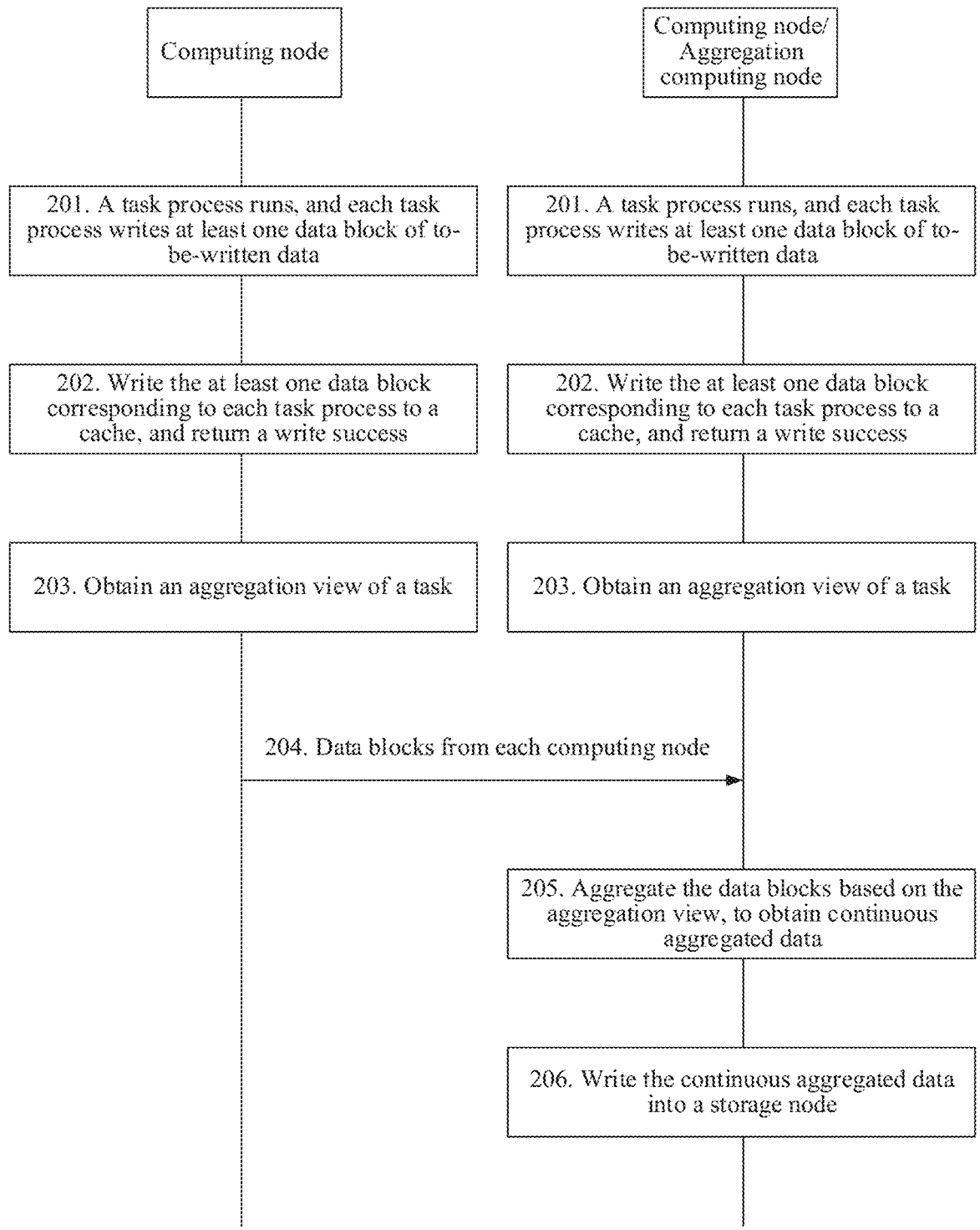
FIG. 2 is a schematic flowchart of a data aggregation method according to an embodiment of this application.

Refer to FIG. 2. A data aggregation method provided in an embodiment of this application includes the following steps.

201. A task process on each computing node runs, and each task process writes at least one data block of to-be-written data.

Figure 3:
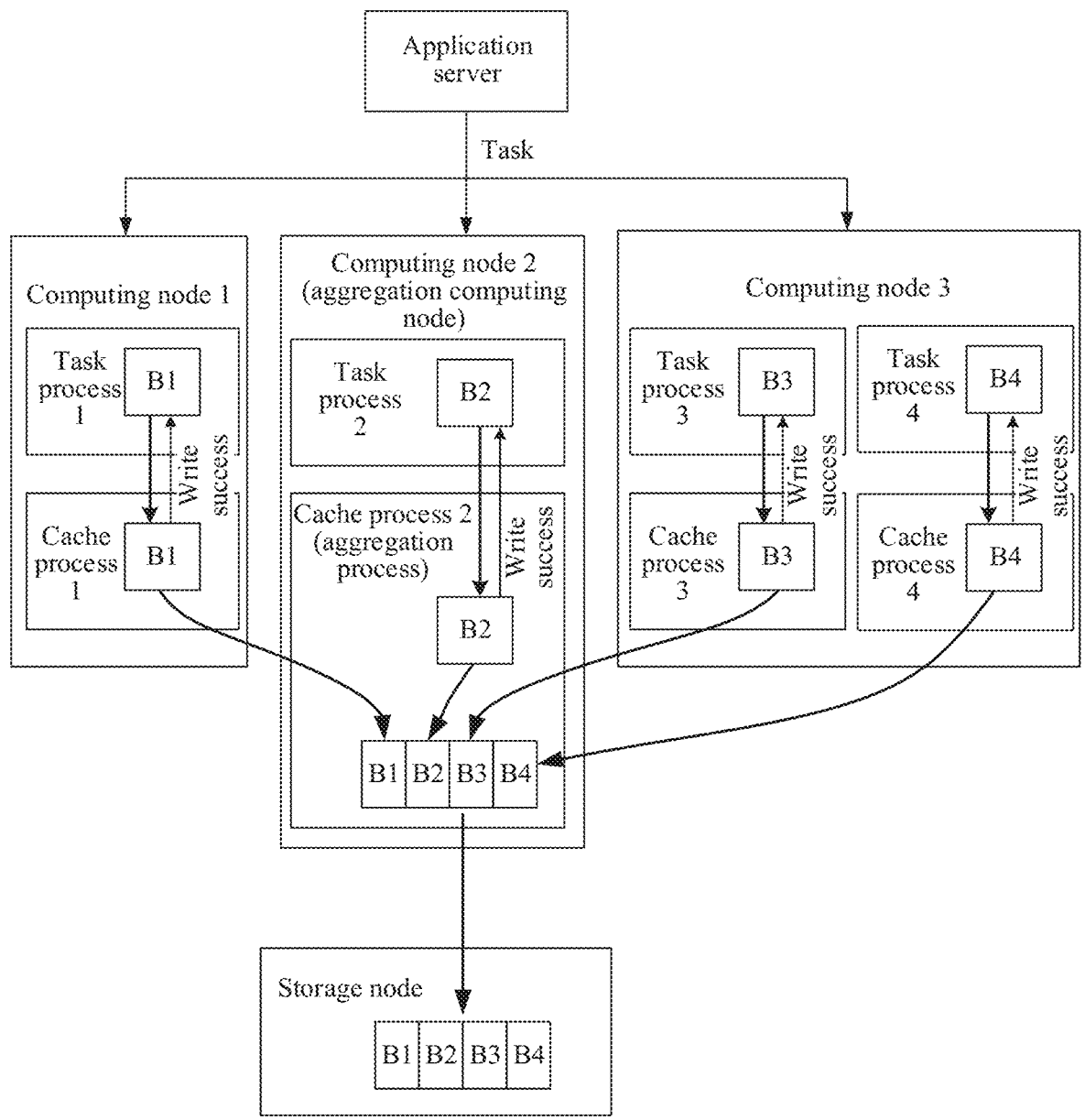
FIG. 3 is a schematic diagram of a data aggregation method according to an embodiment of this application.

FIG. 3 is a schematic diagram of a data aggregation method according to an embodiment of this application. As shown in FIG. 3, at least one task process runs on each computing node, and each task process writes the at least one data block of the to-be-written data into a memory of a computing node in which the process is located. Data blocks written by different task processes are data blocks of a same task.

Optionally, before step 201, each computing node may receive a task delivered by an application server, and write, in step 201, the at least one data block of the to-be-written data based on the task.

Figure 4:
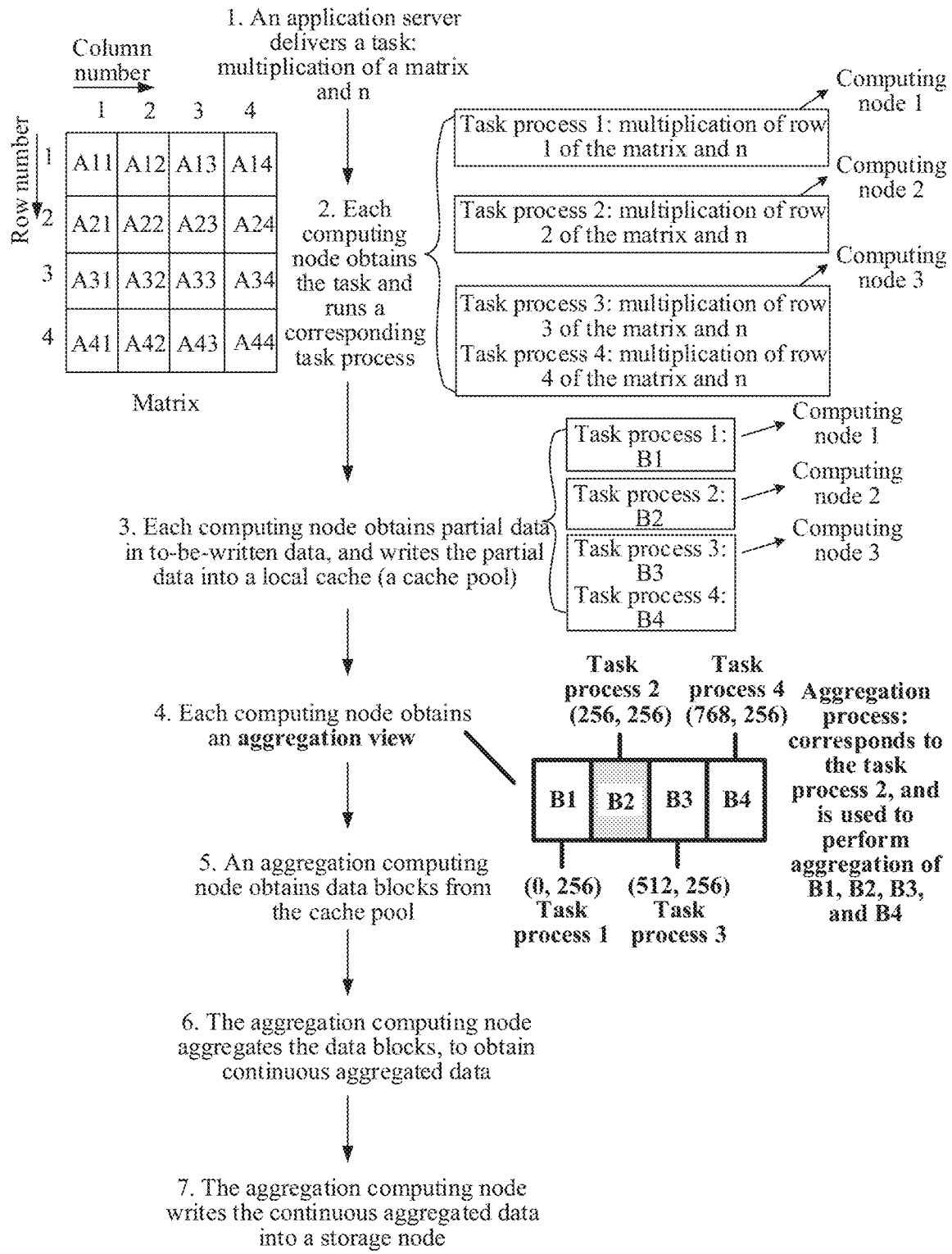
FIG. 4 is another schematic diagram of a data aggregation method according to an embodiment of this application.

Using FIG. 4 as an example, if the task delivered by the application server is to calculate a multiplication result of a 4×4 matrix and a number n, the task process on each computing node may determine a corresponding task and write a corresponding data block.

This embodiment of this application is a distributed computing architecture. Therefore, when delivering a task, the application server allocates a plurality of task processes to the task, and each task process executes a part of the task. For example, the task in FIG. 4 may be implemented through four task processes shown in FIG. 3. The application server may allocate tasks to four task processes for execution, and number each task process, to identify partial data processed by different task processes. Optionally, the application server may deliver a task and a number of a task process allocated to a corresponding computing node to each computing node through a message passing interface (MPI) message communication system. Each computing node runs a corresponding task process based on the task and the number (for example, a computing node 1 runs a task process 1).

If the application server delivers tasks to each computing node through the MPI message communication system, an MPI component runs on each computing node. Communication between computing nodes can be implemented through the MPI component. In the process of delivering the tasks, the application server sends the following tasks to the MPI component on each computing node through the MPI message communication system:

(1) program code for running the task (the code is executed when the plurality of computing nodes write data blocks);

(2) a quantity of task processes allocated to the task (for example, four task processes shown in FIG. 3 and FIG. 4);

(3) a number of a task process allocated to the computing node in all task processes (for example, in FIG. 3, a number of a task process on the computing node 2 is 2);

(4) information about a computing node corresponding to each task process;

(5) a task process number corresponding to an aggregation process; and (6) a data block aggregated by the aggregation process.

The information (4), that is, information about a computing node corresponding to each task process, includes information about computing nodes where all task processes completing the task are located. For any task process, as long as a number of the task process is determined, an address of a computing node in which the task process is located may be determined based on the foregoing information (4), to implement communication with the computing node (data written by the task process).

Information (5), that is, a task process number corresponding to an aggregation process, indicates an aggregation process used to aggregate a data block, and corresponds to one of the plurality of task processes. In this embodiment of this application, the aggregation process and the corresponding task process run on a same computing node (aggregation computing node).

Information (6) indicates that the aggregation process is used to implement aggregation of data blocks written by a task process. For example, the aggregation process (corresponding to the task process 2) in FIG. 4 is used to aggregate data blocks B1, B2, B3, and B4. In the example in FIG. 4, aggregation of all data blocks is implemented by one aggregation process. Actually, there may be a plurality of aggregation processes, which are respectively used to aggregate data blocks of different parts. This is not limited herein.

The task process on each computing node processes corresponding data based on the task of the foregoing information (1) and the number corresponding to the information (3).

For example, if the number of the task process 1 is 1, the corresponding task is a multiplication result of row 1 of the matrix and n. Tasks of task processes on other computing nodes are deduced by analogy, and details are not described herein again.

It should be noted that FIG. 3 is merely an example of task allocation, and does not limit a quantity of computing nodes that complete a task. In addition to the three computing nodes shown in FIG. 3, the task may be allocated to more or fewer computing nodes for completion. This is not limited herein.

202. Each computing node writes the at least one data block corresponding to each task process to a cache, and returns a write success.

On each computing node, in addition to running the task process based on the task delivered by the application server, a cache process is also run corresponding to each task process. As shown in FIG. 3, the task process on each computing node correspondingly runs one cache process.

The task process running on each computing node writes the data block that is written into the memory in step 201 into the cache of the computing node in which the task process is located. If the cache process determines that the data block is written into the cache, the cache process returns a write success to the task process.

On each computing node, the write success indicates that the IO of a corresponding task process is completed, and the task process may process other data.

203. Each computing node obtains an aggregation view of a task.

Each computing node may obtain, based on the task delivered by the application server, the aggregation view corresponding to the task. As shown in FIG. 4, the task is completed by four task processes (that is, task processes 1 to 4 in FIG. 3 and FIG. 4), and each task process writes a part of data. In this case, the aggregation view indicates a position of the four parts of data in continuous aggregated data. When the application server delivers a task, the task is allocated to task processes with different numbers for processing. Therefore, the aggregation view herein further indicates task processes corresponding to the four parts of data.

Using FIG. 4 as an example, B1 is partial data written by the task process 1 after task execution (that is, a multiplication result of row 1 of the matrix and n, B1=(A11×n, A12×n, A13×n, A14×n)). In the aggregation view, parameters corresponding to B1 are (0, 256) and task process 1, indicating that a position of B1 in the aggregated data starts from the 0th bit of a file header, a segment range/offset range (offset) of B1 is 256 bits, and the task process that writes B1 is the task process 1. Parameters corresponding to B2 are (256, 256) and task process 1, indicating that the position of B1 in the aggregated data starts from the 256th bit of the file header, the segment range/offset range (offset) of B2 is 256 bits, and the task process that writes B2 is the task process 2. Parameters and meanings of the partial data generated by other computing nodes in the aggregation view are similar, and are not described herein again.

It should be noted that FIG. 4 is merely an example of the aggregation view. Parameters corresponding to data blocks written by each task process in the aggregation view may also include other content. This is not limited herein. For example, the parameters corresponding to B2 may include (256, 511), indicating that the position of B2 in the aggregated data is from the 256th bit to the 511th bit.

204. The aggregation computing node obtains data blocks from each computing node.

The plurality of computing nodes in the computing node cluster include at least one aggregation node. The foregoing steps 201 to 203 are actions performed by each computing node. Therefore, the aggregation node also performs steps 201 to 203.

It can be learned from step 202 that the cache process corresponding to the task process runs on each computing node, and the cache process on the aggregation computing node is also referred to as the aggregation process.

In step 202, each computing node (task process) writes the data blocks corresponding to each computing node into a cache. In step 203, the aggregation node obtains an aggregation view. In this case, the aggregation process running on the aggregation node may determine, based on the aggregation view, a task process corresponding to the data block that is to be aggregated, to determine computing nodes in which the task processes are located, and further obtain data blocks stored in caches of these computing nodes.

Optionally, if the application server delivers a task through an MPI message communication system, the aggregation process on the aggregation computing node may obtain, through an MPI component on the node, addresses of the computing nodes in which each task process is located (refer to the description of information (4) in step 201).

As shown in step 4 in FIG. 4, the aggregation process on the aggregation computing node may determine, based on the aggregation view, data blocks B1 to B4 that are to be aggregated, where B2 is on the node, the data block B1 corresponds to the task process 1, the data block B3 corresponds to the task process 3, and the data block B4 corresponds to the task process 4.

Optionally, the aggregation computing node may directly read a corresponding data block from the cache of another computing node. For example, the aggregation node in FIG. 3 may determine, based on the MPI component on the node, that the task processes 3 and 4 corresponding to the data blocks B3 and B4 are both on a computing node 3, to directly read B3 and B4 from the cache of the computing node 3.

In addition, the aggregation computing node may also obtain data blocks on other nodes in other manners. For example, the computing node actively sends the data block, and cache processes on each computing node may determine, based on the aggregation view, which aggregation process aggregates the data block on the node, to obtain information about the aggregation computing node in which the aggregation process is located, and send, based on the information about the aggregation computing node, the data block cached in step 202 to the aggregation node.

It should be noted that, in this embodiment of this application, the MPI message communication system is used as an example to describe how the aggregation computing node obtains the data blocks from each computing node. The MPI message communication system is only an implementation of exchanging the data blocks. In addition to the MPI message communication system, the data blocks may be transmitted in a parallel network common data form (PnetCDF) or another manner. This is not limited herein.

205. The aggregation computing node aggregates the data blocks based on the aggregation view, to obtain continuous aggregated data.

The aggregation computing node may aggregate the data blocks that are from the computing nodes and that are obtained in step 204 based on the aggregation view obtained in step 203, to obtain continuous aggregated data.

As shown in FIG. 3, step 205 may be performed by the aggregation process running on the aggregation node. The aggregation process aggregates the data blocks B1, B2, B3, and B4 from the computing nodes 1 to 3 based on the aggregation view, to obtain the continuous aggregated data.

206. The aggregation computing node writes the continuous aggregated data into a storage node.

After obtaining the continuous aggregated data, the aggregation computing node may write the continuous aggregated data into the storage node. Specifically, this step may be performed by the aggregation process.

Optionally, the computing node cluster may also include at least two aggregation computing nodes, and each aggregation computing node may be configured to implement aggregation of some data blocks in the task.

Figure 5:
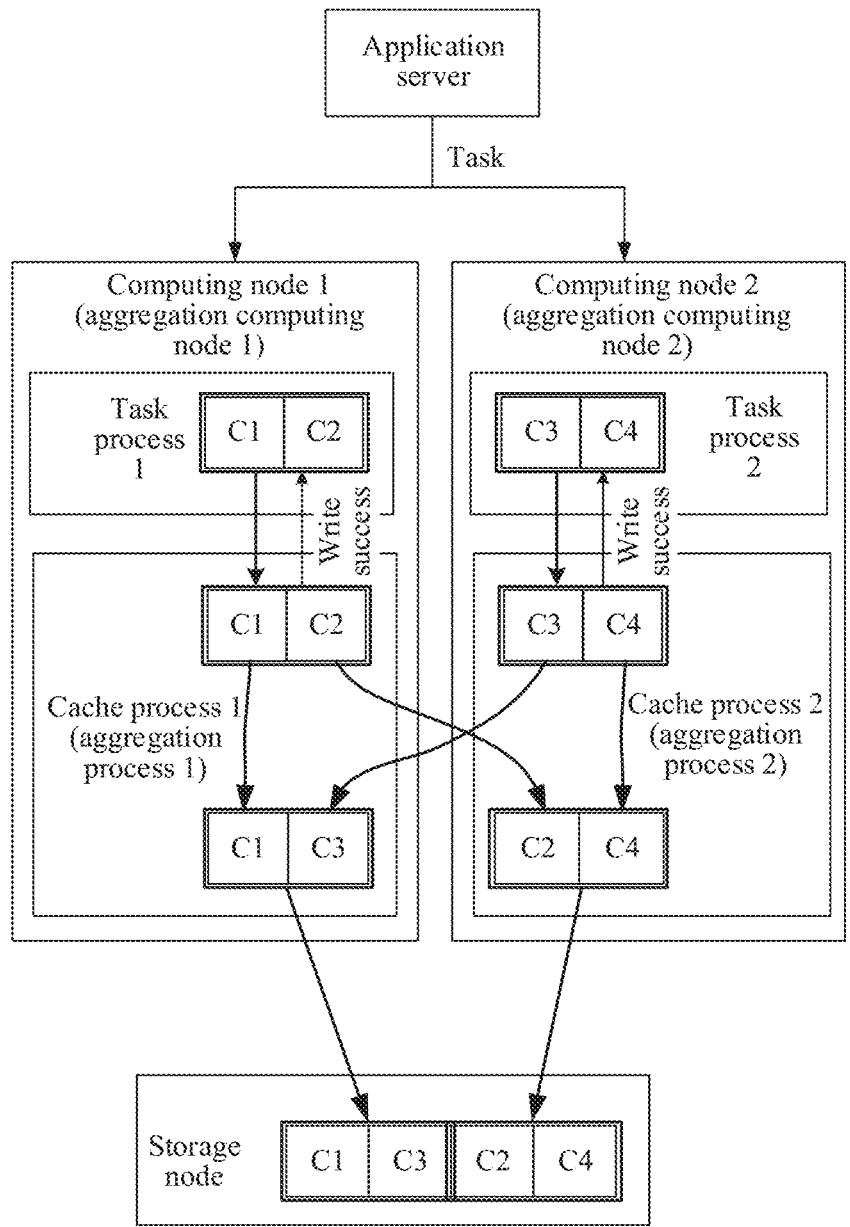
FIG. 5 is another schematic diagram of a data aggregation method according to an embodiment of this application.

As shown in FIG. 5, an aggregation computing node 1 is configured to aggregate data blocks C1 and C3, and an aggregation computing node 2 is configured to aggregate data blocks C2 and C4. In step 204 (the aggregation computing node obtains data blocks from each computing node), the aggregation computing node 1 may determine, based on the aggregation view, whether the data blocks C1 and C3 that are to be aggregated are locally in the aggregation computing node, where C3 is not local, and the aggregation computing node 1 may determine that a computing node in which C3 is located is the computing node 2, to obtain the data block C3 from the computing node 2. In addition, aggregation of the data blocks C1 and C3 is implemented in step 205. For a process in which the aggregation computing node determines information about the computing node of the data block that is to be aggregated, refer to the description in step 204. Details are not described herein again.

Optionally, in a process in which the aggregation computing node 1 obtains the data block C3 from the computing node 2, the aggregation computing node 1 may directly read the data block C3 from the cache of the computing node 2. The aggregation process of the aggregation computing node 2 is similar, and details are not described again.

Optionally, the process in which the aggregation computing node 1 obtains the data block C3 from the aggregation computing node 2 may also be implemented by actively sending the data block by the aggregation computing node 2. Specifically, in step 204, the aggregation computing node 2 may determine, based on the aggregation view, whether the data blocks C3 and C4 written into the cache in step 202 include a data block that is not aggregated on the aggregation computing node (the aggregation computing node 2), where C3 is not aggregated on the aggregation computing node, and the aggregation computing node 2 may determine that the aggregation computing node configured to aggregate the data block C3 is the aggregation computing node 1, to send the data block C3 to the aggregation computing node 1, and implement aggregation of the data block C3. In addition, the aggregation computing node 2 may aggregate the data block C4 cached on the node with the data block C2 from the aggregation computing node 1. For a process in which the computing node determines the information about the aggregation computing node configured to aggregate the corresponding data block, refer to the description in step 204. Details are not described herein again.

The method in FIG. 2 is applied to the architecture shown in FIG. 1. The task process is a process running on the CPU 112, and the cache process/aggregation process may run on the CPU 112, or may run on the network adapter 114. This is not limited herein. That is, on the aggregation computing node, steps 201 to 206 may be implemented by the CPU 112; or steps 201 and 202 (excluding returning a write success) may be implemented by the CPU 112, and steps 202 (returning a write success) and 203 to 206 are implemented by the network adapter 114.

In this embodiment of this application, steps 201 and 202 are referred to as input-output (IO) of each task process, and steps 203 to 206 are referred to as a data aggregation process of the aggregation process. In step 202, a write success is returned, and the task process completes the IO, so that processing of other data can be performed. Compared with a conventional data aggregation method, the IO is completed only after data aggregation is completed to obtain continuous aggregated data, and each task process can process other data. In this embodiment of this application, the IO is decoupled from the data aggregation. In a data aggregation process, the IO is completed, and the task process may process other data. Therefore, in the data aggregation process, resources such as a CPU computing resource and a memory occupied by the task process are released, thereby improving CPU resource utilization and data processing efficiency.

In a process of executing a task, if write operations of a plurality of to-be-written data need to be performed, that is, a plurality of rounds of IO and data aggregation need to be performed, each task process needs to write partial data (some data blocks) of the plurality of to-be-written data, and the aggregation computing node needs to perform data aggregation (IO1, aggregation of data blocks in IO1, IO2, aggregation of data blocks in IO2 . . . ) for many times. The IO is decoupled from the data aggregation. In a process in which the aggregation process performs previous data aggregation, each task process may perform IO corresponding to next data aggregation (for example, when data blocks in the IO1 are aggregated, the IO2 may be performed at the same time), so that different rounds of IO and data aggregation are implemented in parallel, thereby reducing a latency of waiting by the task process, and reducing a delay of completing an entire task.

The foregoing describes an implementation architecture and a method procedure of embodiments of this application. The following describes a computing device provided in embodiments of this application.

Figure 6:
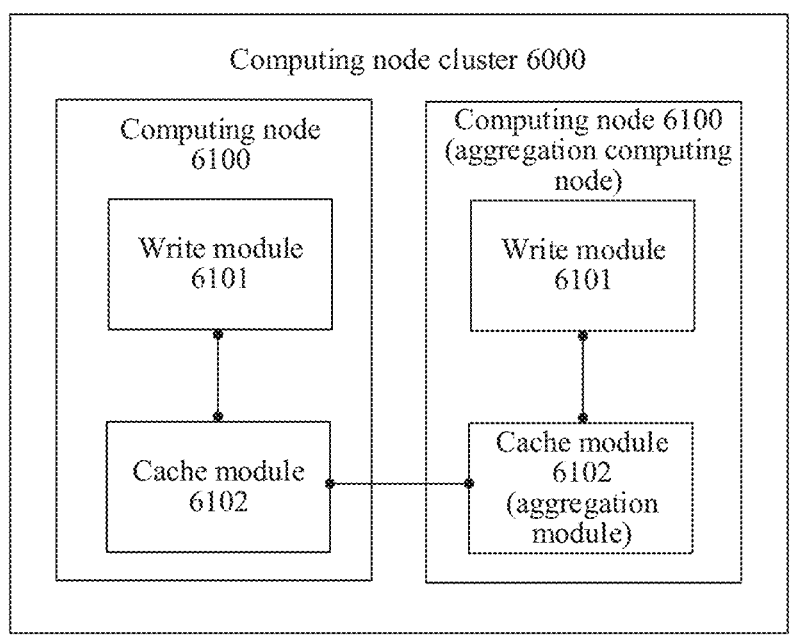
FIG. 6 is a schematic diagram of a computing node cluster according to an embodiment of this application.

At a hardware layer, a structure of a computing node is shown in the computing node 110 in FIG. 1. As shown in FIG. 6, on a software layer, a computing node cluster 6000 includes a plurality of computing nodes 6100, and the plurality of computing nodes 6100 include at least one aggregation computing node. The two computing nodes 6100 in FIG. 6 are merely examples, and do not limit a quantity of computing nodes 6100 and a quantity of aggregation computing nodes.

Each computing node 6100 includes a write module 6101 and a cache module 6102, and the cache module 6102 on the aggregation computing node 6100 is also referred to as an aggregation module.

The write module 6101 is configured to jointly perform a write operation on to-be-written data. Specifically, each write module 6101 is configured to write partial data in the to-be-written data to a cache of a computing node in which the write module 6101 is located. The cache module 6102 is configured to return a write success to the write module 6101 after the partial data is written into the cache of the computing node in which the corresponding write module 6101 is located.

The cache module 6102 (aggregation module) on the aggregation computing node is configured to aggregate the partial data in to-be-written data stored in caches of the plurality of computing nodes into aggregated data with consecutive addresses, and write the aggregated data into a storage node.

The write module 6101 is configured to implement steps performed by the task process in the embodiment shown in FIG. 2, that is, steps 201 to 202 (excluding returning a write success).

The cache module 6102 is configured to implement step 202 (that is, returning a write success) in FIG. 2 to step 204. In addition, the cache module 6102 (aggregation module) on the aggregation computing node is further configured to implement steps performed by the aggregation process in FIG. 2, that is, steps 204 to 206.

Optionally, on the aggregation computing node, the cache module 6102 (aggregation module) may be a functional module in a processor of the aggregation computing node, or may be a network adapter on the aggregation computing node. The network adapter may be a network adapter that is inherent in the aggregation computing node and that is configured to interact with another device, or may be a pluggable network adapter. This is not limited herein.

It may be clearly understood by a person skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of the software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

What is claimed is:

1. A computing node cluster, comprising a plurality of computing nodes, wherein the plurality of computing nodes comprise an aggregation computing node;
    the plurality of computing nodes are configured to jointly perform a write operation on to-be-written data based on a task delivered by an application server, and each of the plurality of computing nodes is configured to return a write success after writing partial data in the to-be-written data into a local cache; and
    the aggregation computing node is configured to:
        determine an aggregation view based on a task delivered by an application server;
        determine, based on the aggregation view, computing node information in which a data block that is to be aggregated by the aggregation computing node is located;
        obtain, from a corresponding computing node based on the computing node information, the data block that is to be aggregated by the aggregation computing node;
        aggregate the partial data stored in caches of the plurality of computing nodes into aggregated data with consecutive addresses; and
        write the aggregated data into a storage node.

2. The computing node cluster according to claim 1, wherein the computing node cluster comprises at least two aggregation computing nodes, each of the at least two aggregation computing nodes is configured to aggregate a plurality of data blocks in the to-be-written data, addresses of the plurality of data blocks are consecutive, and when aggregating the plurality of data blocks, each aggregation computing node is configured to:
    determine whether the data block that is to be aggregated by the aggregation computing node is local, and when the data block is not local, determine a computing node in which the data block is located, obtain the data block from a cache of the determined computing node, and aggregate the data block with a data block in the aggregation computing node.

3. The computing node cluster according to claim 2, wherein the plurality of computing nodes comprise caches, the caches of the plurality of computing nodes form a shared cache pool, and each computing node can access data in the shared cache pool; and
    the obtaining the data block from a cache of the determined computing node comprises:
    directly reading, by the aggregation computing node, the data block from the cache of the computing node.

4. The computing node cluster according to claim 1, wherein the computing node cluster comprises at least two aggregation computing nodes, each of the at least two aggregation computing nodes is configured to aggregate a plurality of data blocks in the to-be-written data, addresses of the plurality of data blocks are consecutive, and when aggregating the plurality of data blocks, each aggregation computing node is configured to:
    determine whether a cache of the aggregation computing node comprises a data block that is not aggregated by the aggregation computing node, and when the cache of the aggregation computing node comprises the data block, determine an aggregation computing node that aggregates the data block, and send the data block to the aggregation computing node that aggregates the data block; and
    receive a data block that is to be aggregated by the aggregation computing node and that is sent by another computing node, and aggregate the data block with a data block in the aggregation computing node.

5. A data aggregation method, comprising:
    returning, by each computing node in a plurality of computing nodes, a write success after writing partial data in to-be-written data into a local cache, wherein the plurality of computing nodes are comprised in a computing node cluster, the plurality of computing nodes comprise an aggregation computing node, wherein the plurality of computing nodes are configured to: jointly perform a write operation on the to-be-written data based on a task delivered by an application server;
    determining an aggregation view based on a task delivered by an application server;

determining, based on the aggregation view, computing node information in which a data block that is to be aggregated by the aggregation computing node is located;

obtaining, from a corresponding computing node based on the computing node information, the data block that is to be aggregated by the aggregation computing node; and aggregating, by the aggregation computing node, the partial data stored in caches of the plurality of computing nodes into aggregated data with consecutive addresses, and writing the aggregated data into a storage node.

6. The method according to claim 5, wherein the computing node cluster comprises at least two aggregation computing nodes, each of the at least two aggregation computing nodes is configured to aggregate a plurality of data blocks in the to-be-written data, and addresses of the plurality of data blocks are consecutive; and the aggregating, by the aggregation computing node, the partial data stored in caches of the plurality of computing nodes into aggregated data with consecutive addresses comprises:

determining, by each aggregation computing node, whether the data block that is to be aggregated by the aggregation computing node is local, and when the data block is not local, determining a computing node in which the data block is located, obtaining the data block from a cache of the determined computing node, and aggregating the data block with a data block in the aggregation computing node.

7. The method according to claim 6, wherein the plurality of computing nodes comprise caches, the caches of the plurality of computing nodes form a shared cache pool, and each computing node can access data in the shared cache pool; and the obtaining the data block from a cache of the determined computing node comprises:

directly reading, by the aggregation computing node, the data block from the cache of the computing node.

8. The method according to claim 5, wherein the computing node cluster comprises at least two aggregation computing nodes, each of the at least two aggregation computing nodes is configured to aggregate a plurality of data blocks in the to-be-written data, and addresses of the plurality of data blocks are consecutive; and the aggregating, by the aggregation computing node, the partial data stored in caches of the plurality of computing nodes into aggregated data with consecutive addresses comprises:

determining, by each aggregation computing node, whether a cache of the aggregation computing node comprises a data block that is not aggregated by the aggregation computing node, and when the cache of the aggregation computing node comprises the data block, determining an aggregation computing node that aggregates the data block, and sending the data block to the aggregation computing node that aggregates the data block; and receiving, by each aggregation computing node, a data block that is aggregated by the aggregation computing node and that is sent by another computing node, and aggregating the data block with a data block in the aggregation computing node.

9. An aggregation computing node, comprising:

at least one processor;

one or more non-transitory computer-readable storage media coupled to the at least one processor and storing programming instructions for execution by the at least one processor, wherein the programming instructions, when executed, cause the aggregation computing node to perform operations comprising:

determining an aggregation view based on a task delivered by an application server;

determining, based on the aggregation view, computing node information in which a data block that is to be aggregated by the aggregation computing node is located;

obtaining, from a corresponding computing node based on the computing node information, the data block that is to be aggregated by the aggregation computing node;

aggregating partial data stored in caches of a plurality of computing nodes into aggregated data with consecutive addresses, wherein the partial data is written by each computing node in a plurality of computing nodes into a local cache of the respective computing node, and wherein the plurality of computing nodes and the plurality of computing nodes belong to a computing node cluster; and writing the aggregated data into a storage node based on the task.

10. The aggregation computing node according to claim 9, wherein the operations comprise:

determining whether a cache of the aggregation computing node comprises a data block that is not aggregated by the aggregation computing node; and when the cache of the aggregation computing node comprises the data block, determining an aggregation computing node that aggregates the data block, and sending the data block to the aggregation computing node that aggregates the data block.

11. The aggregation computing node according to claim 9, wherein the operations comprise:

receiving a data block that is sent by another computing node, and aggregate the data block with a data block in the aggregation computing node.

\* \* \* \* \*